United States Patent
Ohkubo

(10) Patent No.: US 8,246,519 B2
(45) Date of Patent: Aug. 21, 2012

(54) AUTOMATIC CLUTCH CONTROL APPARATUS

(75) Inventor: Tadanao Ohkubo, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 651 days.

(21) Appl. No.: 12/449,008

(22) PCT Filed: Jul. 30, 2008

(86) PCT No.: PCT/JP2008/002026
§ 371 (c)(1),
(2), (4) Date: Jul. 20, 2009

(87) PCT Pub. No.: WO2009/022450
PCT Pub. Date: Feb. 19, 2009

(65) Prior Publication Data
US 2010/0041515 A1  Feb. 18, 2010

(30) Foreign Application Priority Data

Aug. 10, 2007  (JP) .................................. 2007-208803

(51) Int. Cl.
*B60W 10/02* (2006.01)
*B60W 10/04* (2006.01)

(52) U.S. Cl. ......................................... 477/174; 477/76
(58) Field of Classification Search ................... 477/70, 477/76, 97, 98, 166, 174, 175, 180
See application file for complete search history.

(56) References Cited

U.S. PATENT DOCUMENTS

| 7,329,206 | B2 * | 2/2008 | Tanaka | 477/176 |
| 7,708,095 | B2 * | 5/2010 | Hirata | 180/65.275 |
| 2002/0055415 | A1 * | 5/2002 | Yoshikawa et al. | 477/166 |
| 2004/0192506 | A1 * | 9/2004 | Nakamura | 477/176 |

FOREIGN PATENT DOCUMENTS

| DE | 198 57 707 A1 | 6/1999 |
| DE | 10 2006 018 683 A1 | 10/2007 |
| JP | A-2000-130474 | 5/2000 |
| JP | A-2004-245325 | 9/2004 |

* cited by examiner

*Primary Examiner* — Justin Holmes
(74) *Attorney, Agent, or Firm* — Oliff & Berridge, PLC

(57) ABSTRACT

In an automatic clutch control with respect to a pressure-disengaged type of automatic clutch, when an working oil temperature increase has occurred in a state in which a clutch master cylinder is not in communication with a reservoir tank, a clutch stroke position is changed in a clutch engaging direction such that the number of engine revolutions matches the number of engine revolutions at the point in time when the clutch master cylinder and the reservoir tank became not in communication.

7 Claims, 9 Drawing Sheets

[Fig. 1]
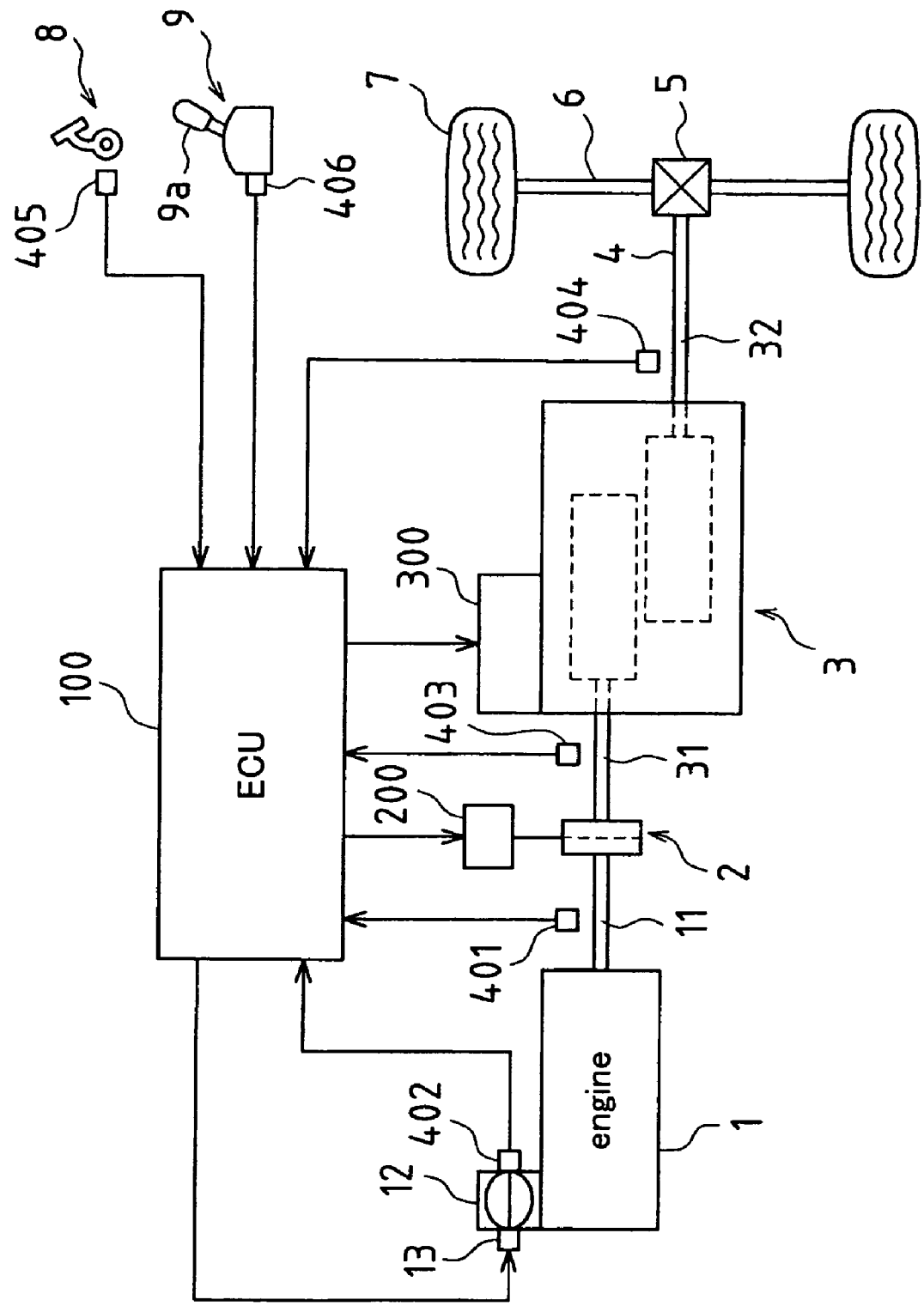

[Fig. 2]
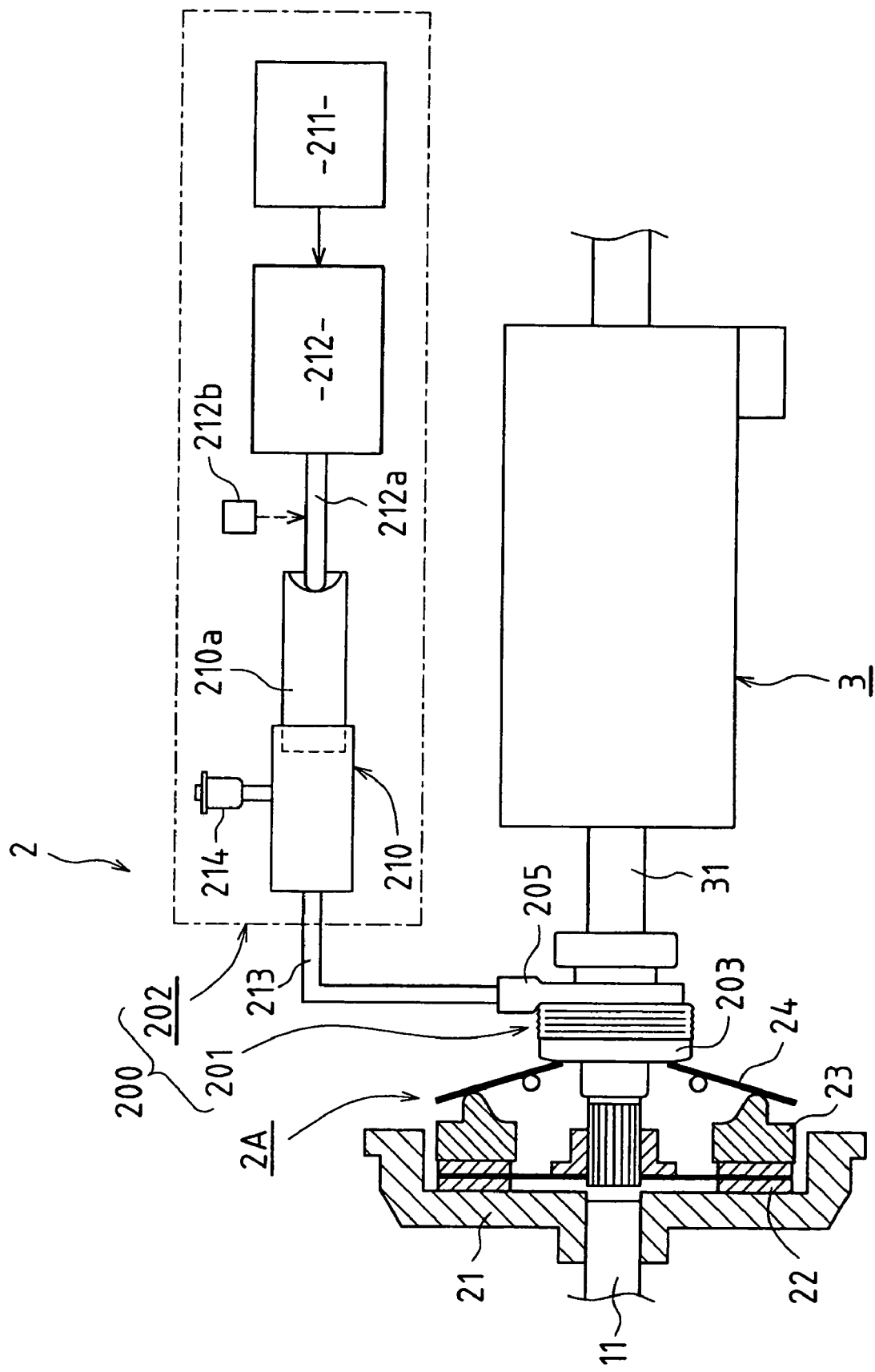

[Fig. 3]
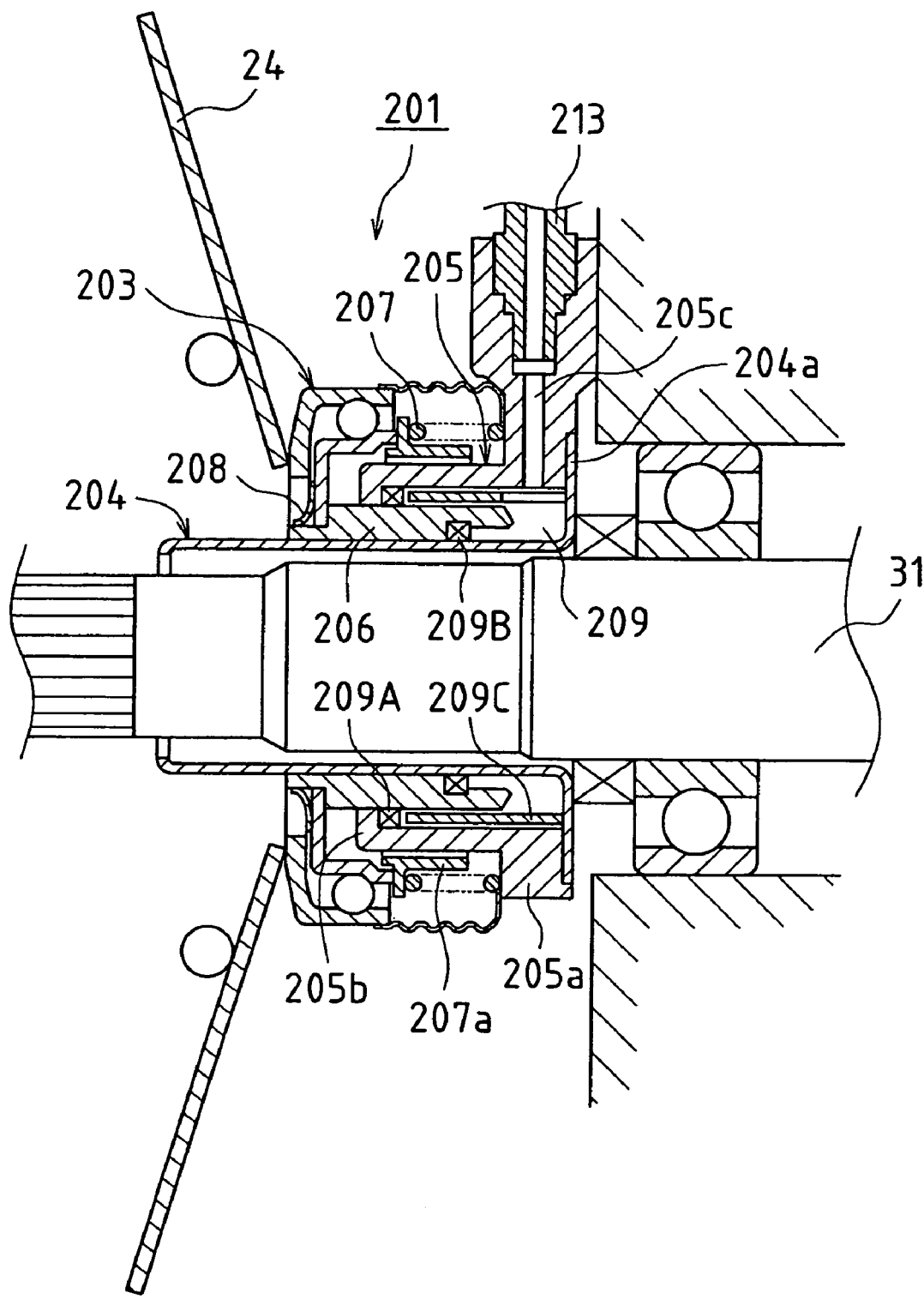

[Fig. 4]
A
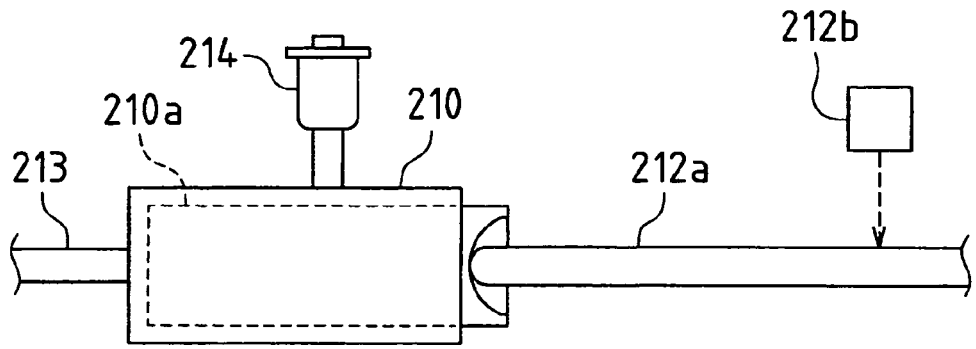
B
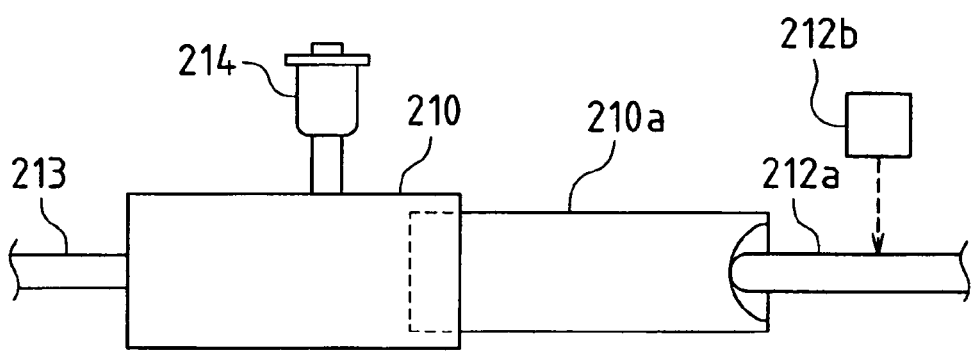
C
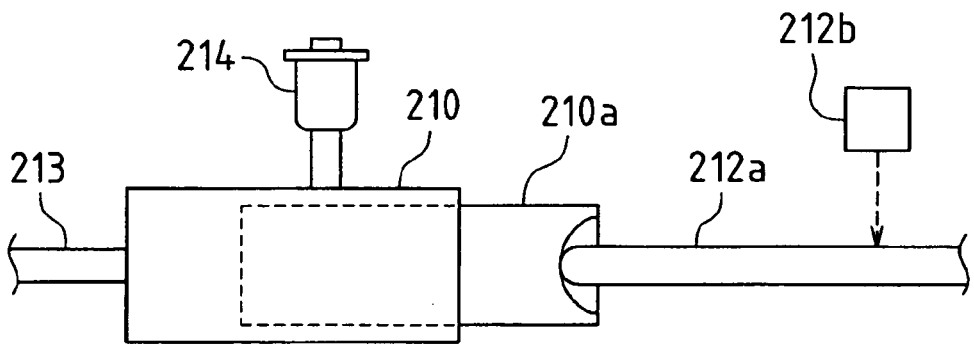
D
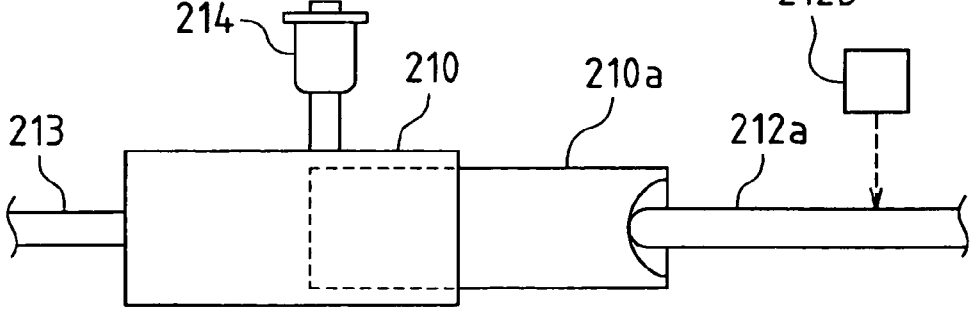

[Fig. 5]
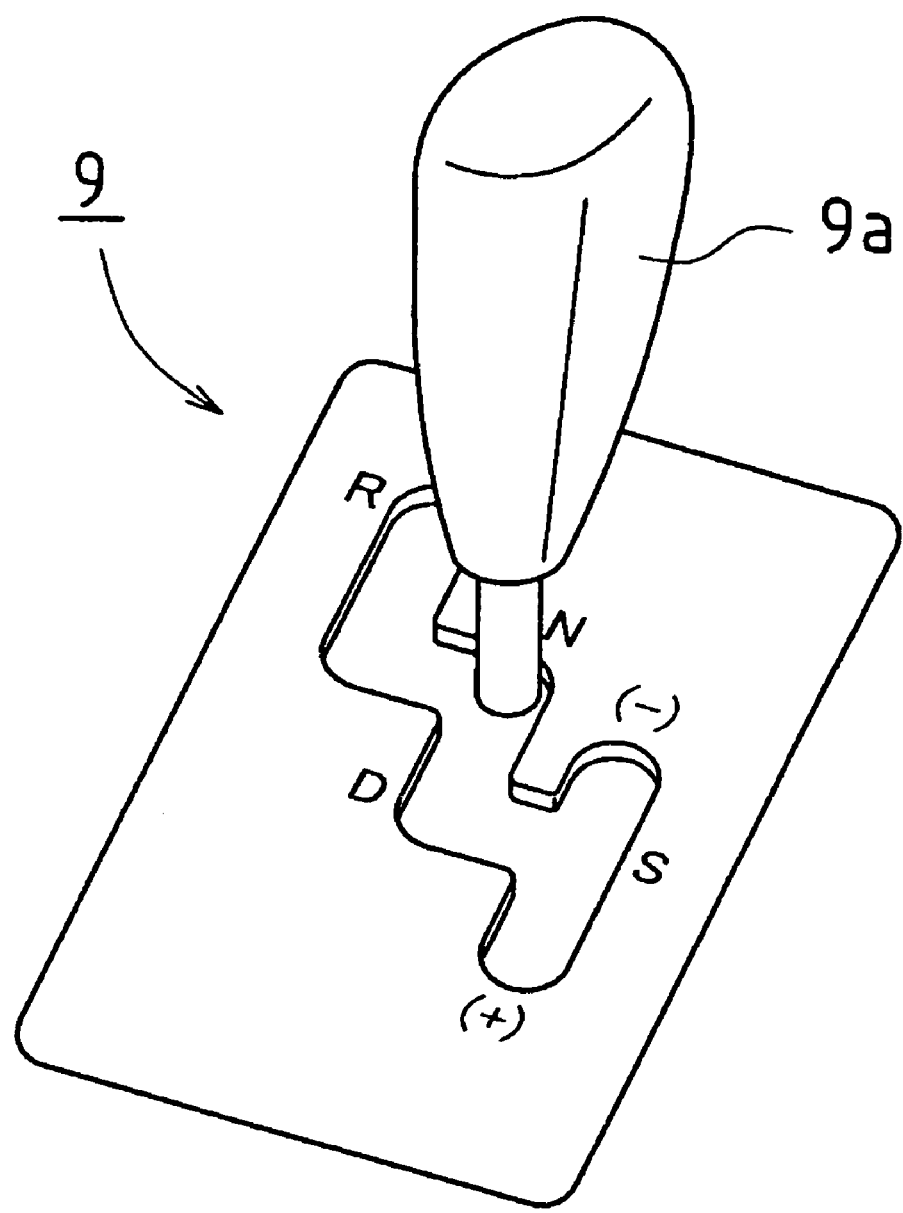

[Fig. 6]
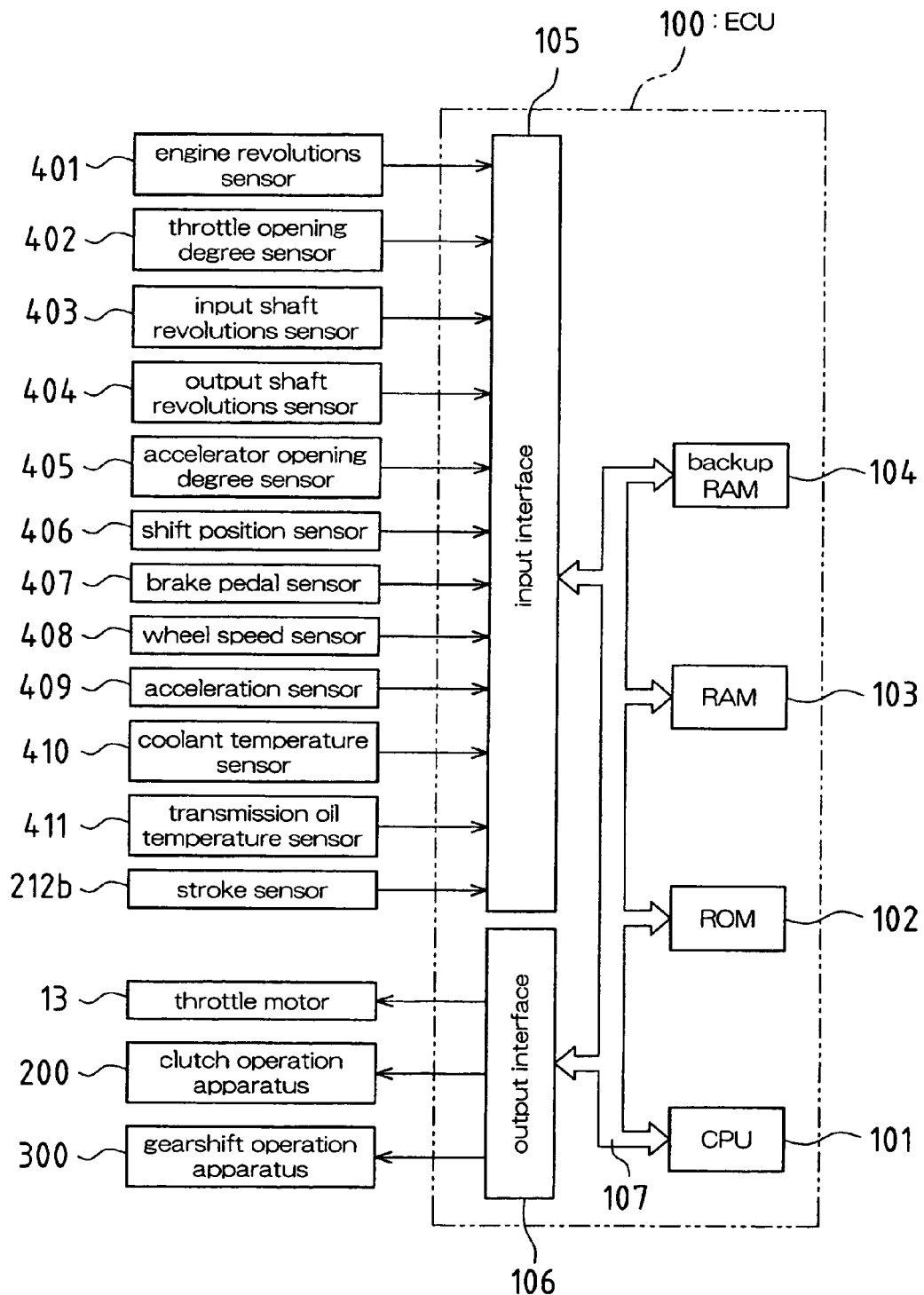

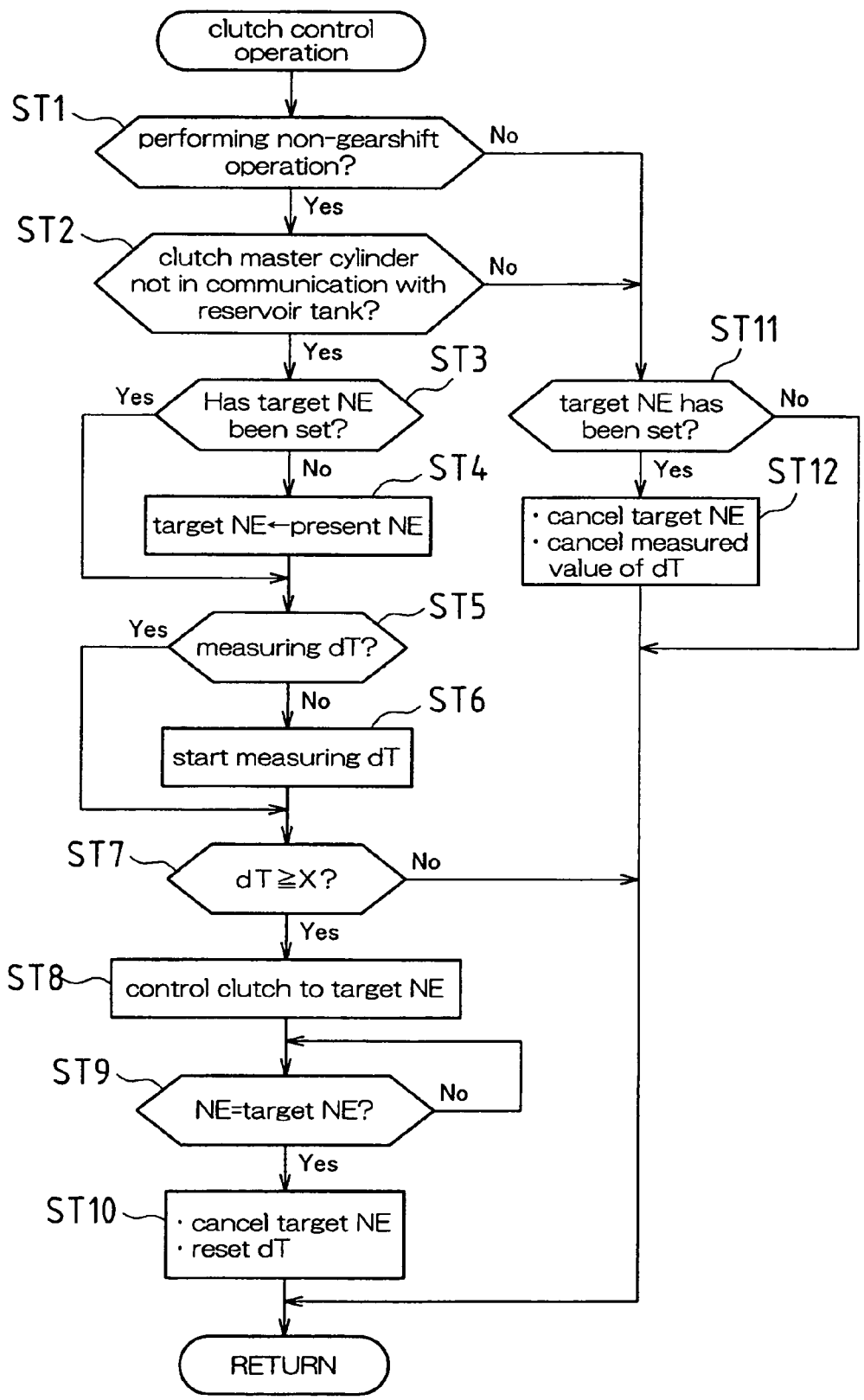
[Fig. 7]

[Fig. 8]
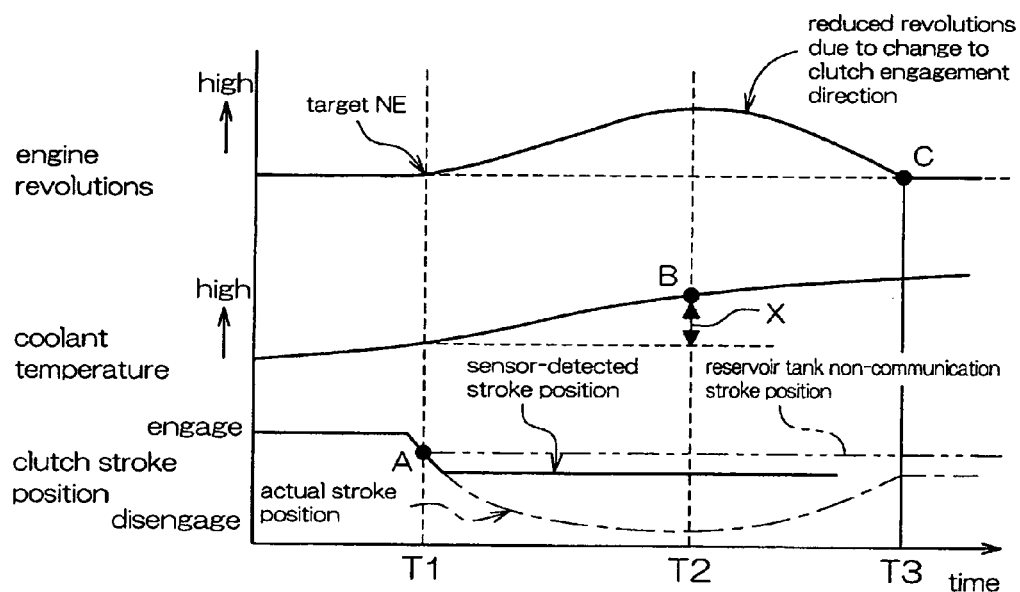
[Fig. 9]
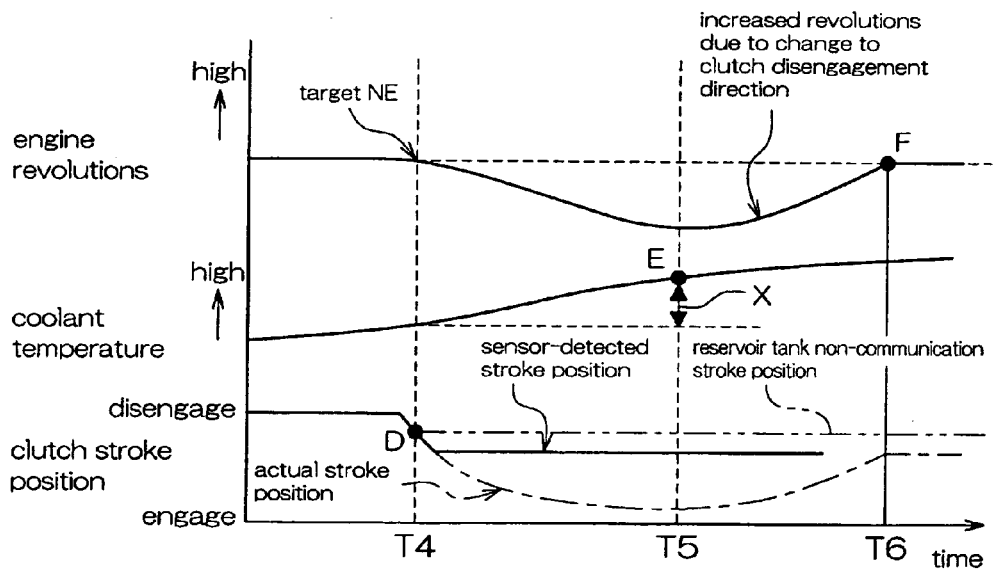

[Fig. 10]
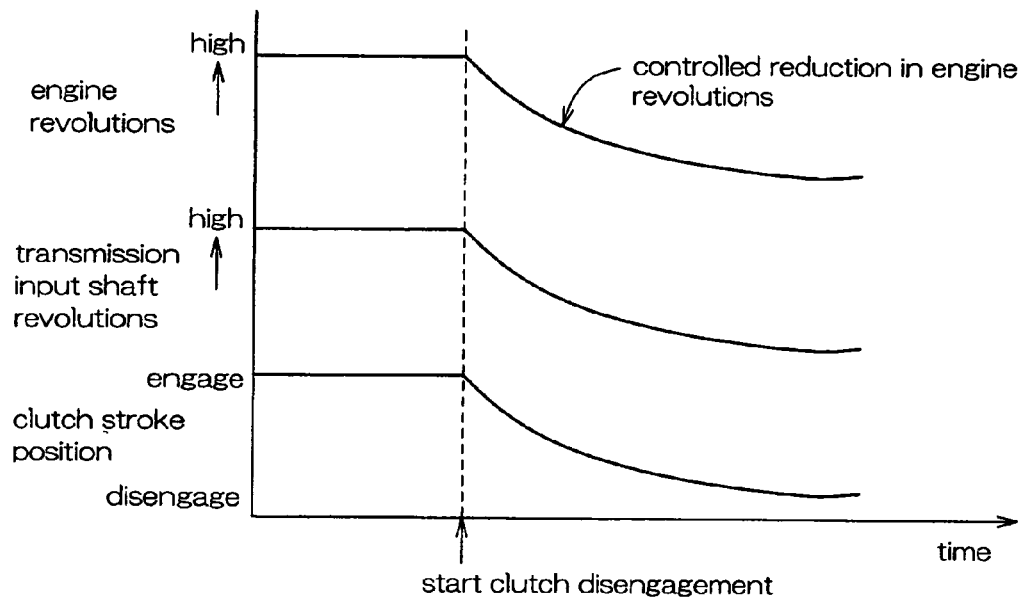
[Fig. 11]
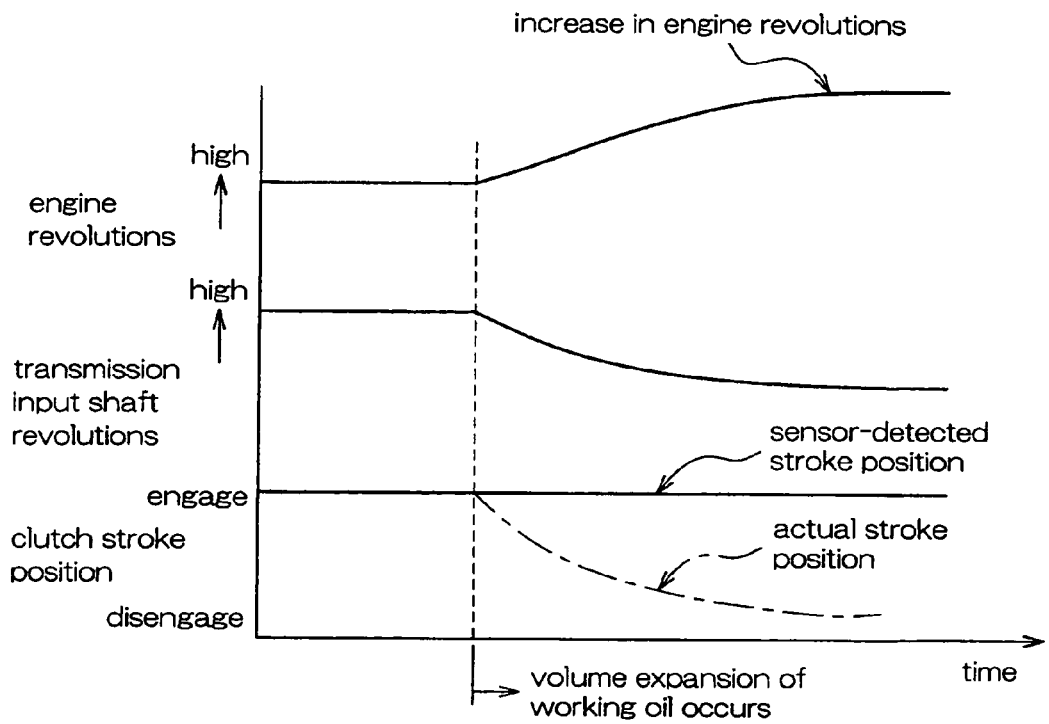

AUTOMATIC CLUTCH CONTROL APPARATUS

TECHNICAL FIELD

The present invention relates to an apparatus for controlling an automatic clutch that is provided in an automobile or the like and engages/disengages an engine (drive source) and a transmission with each other. More specifically, the invention relates to a measure for improving the reliability of operation of the automatic clutch.

BACKGROUND ART

Conventionally, automobile power transmission systems are known in which an automatic clutch is disposed between an engine and a transmission. This automatic clutch, as disclosed for example in below Patent Citation 1 and Patent Citation 2, is configured so that a clutch mechanism for engaging/disengaging between the engine and the transmission is automatically operated by a clutch actuator.

This type of automatic clutch, for example, is configured with the same sort of parallel gear transmission as an ordinary manual transmission, and is used in combination with an automatic manual transmission (usually referred to as an AMT) that automatically performs a gearshift operation (an operation to switch gears) by employing a selection actuator, a shift actuator, and the like. Also, this automatic clutch may be combined with an ordinary manual transmission (non-AMT).

Below is a description of the overall configuration of this automatic clutch. Note that in the description below, an example is given in which a clutch disengaged state is established when using oil pressure (when applying pressure) from the clutch actuator, and a clutch engaged state is established when oil pressure is released.

The automatic clutch is provided with a friction-type clutch mechanism, and a clutch operation apparatus that operates the clutch mechanism.

The clutch mechanism, for example, is provided with a diaphragm spring for establishing the clutch engaged state by pressing a clutch disk against a flywheel attached to a crank shaft of the engine so as to revolve together with the crank shaft. Also, a release bearing is provided in order to apply/release biasing force in the axial direction on the center portion of the diaphragm spring. That is, if the release bearing is moved forward to apply biasing force in the axial direction on the center portion of the diaphragm spring, pressing force of the clutch disk against the flywheel is released, and thus the clutch disengaged state is established. Conversely, if the release bearing is moved rearward to release biasing force in the axial direction on the center portion of the diaphragm spring, the clutch disk is pressed against the flywheel, and thus the clutch engaged state is established.

Also, the above clutch operation apparatus is provided with a hydraulic control apparatus that generates an actuating force for moving the release bearing to the front and to the rear. Specifically, this hydraulic control apparatus generates oil pressure in order to operate the clutch mechanism, and by controlling the oil pressure from this hydraulic control apparatus, the automatic clutch is switched between the disengaged state and the engaged state. Also, the position (referred to below as a clutch stroke position) of the clutch disk that is set by movement of the release bearing is detected or estimated by a stroke sensor, and with feedback control based on the clutch stroke position, the aforementioned oil pressure is adjusted so that an appropriate clutch stroke position is obtained.

Note that in the description of the above automatic clutch, an example is given in which a clutch disengaged state is established when using oil pressure (when applying pressure) from the hydraulic control apparatus, and a clutch engaged state is established when oil pressure is released, but automatic clutches are also known in which conversely, a clutch engaged state is established when using oil pressure (when applying pressure) from the hydraulic control apparatus, and a clutch disengaged state is established when oil pressure is released. Below, the former automatic clutch is referred to as a "pressure-disengaged type", and the latter is referred to as a "pressure-engaged type".

Also, particularly in Patent Citation 2, when trouble such as a failure of the stroke sensor occurs, clutch stroke control is performed based on information such as the number of engine revolutions, thereby insuring reliability of the automatic clutch.

PTL 1: JP 2004-245325A
PTL 2: JP 2000-130474A

DISCLOSURE OF INVENTION

Technical Problem

However, there may be conditions in which even though trouble such as a failure of the stroke sensor has not occurred, the clutch stroke position is not appropriately obtained, and thus reliability of the automatic clutch is impaired. Such a case will be specifically described below.

In the aforementioned automatic clutch, when it is not possible to secure a sensor placement space in the area of the release bearing as the position where the stroke sensor for detecting the clutch stroke position is arranged, the stroke sensor may be provided in the hydraulic control apparatus. That is, the stroke sensor is arranged at a position such that a piston position within a clutch master cylinder provided in the hydraulic control apparatus can be detected. With feedback control based on an estimation of the distance from the piston position to the clutch stroke position, the oil pressure is controlled to adjust the clutch stroke position.

However, when the stroke sensor is arranged in such a position, there may be cases when an offset occurs between the clutch stroke position estimated based on the piston position detected by the stroke sensor and the actual clutch stroke position. That is, working oil fills an oil pressure circuit from the clutch master cylinder to the release bearing, and the volume of this working oil changes depending on the temperature of the working oil. Particularly, in a condition in which the temperature of the working oil increases, the volume of the working oil expands, and although the piston within the clutch master cylinder is not moving, the release bearing is pressed against the diaphragm spring side to the extent of that volume expansion.

In the case of the above "pressure-disengaged type" of automatic clutch, due to this volume expansion, although the piston of the hydraulic control apparatus is not moving in the direction that applies pressure, the clutch changes in the disengaging direction. Conversely, in the case of the above "pressure-engaged type" of automatic clutch, due to the volume expansion, although the piston of the hydraulic control apparatus is not moving in the direction that applies pressure, the clutch changes in the engaging direction.

In this sort of condition, when the automobile begins to move, or during creeping travel (when a so-called half-clutch state is maintained, thus causing the vehicle to move), there is a high possibility that the following sorts of problems will occur.

Problems with a "Pressure-Disengaged Type" of Automatic Clutch

With the above "pressure-disengaged type" of automatic clutch, when volume expansion of the working oil occurs when the automobile begins to move or during creeping travel, the oil pressure on the diaphragm spring increases, the clutch is stroked to a position that is further to the side of the disengaging direction than the appropriate stroke position. Thus, in this condition problems occur such as that there is much slippage of the clutch, rotational drive power from the engine is not adequately transmitted to the transmission side, there is poor starting movement or poor acceleration when the automobile begins to move, or poor creeping travel in the case of creeping travel (a condition in which a predetermined creeping travel speed is not obtained), and the amount of friction of the clutch disk increases. Also, because there is much clutch slippage, the amount of heat generated by the clutch disk increases, promoting volume expansion of the working oil.

FIG. 10 shows, in this "pressure-disengaged type" of automatic clutch, an example of changes in the clutch stroke position in normal operation in which volume expansion of the working oil has not occurred, and corresponding changes in the number of engine revolutions and the number of transmission input shaft revolutions. As shown in FIG. 10, during normal operation, the number of engine revolutions decreases as the clutch moves in the disengaging direction. For example, the number of engine revolutions is reduced by controlling the degree of throttle opening or the like. Thus, an increase in the number of engine revolutions (an increase accompanying a lightened engine load) caused by the clutch moving in the disengaging direction is prevented. This is accompanied by a decrease in the number of input shaft revolutions of the transmission.

On the other hand, FIG. 11 shows, in the above "pressure-disengaged type" of automatic clutch, an example of changes in the clutch stroke position in a condition in which volume expansion is occurring in the working oil, and corresponding changes in the number of engine revolutions and the number of transmission input shaft revolutions. As shown in FIG. 11, when volume expansion occurs in the working oil, although a clutch disengaging operation (operation of the clutch actuator to the piston disengaging side) is not being performed, the clutch moves in the disengaging direction. In FIG. 11, of the lines that indicate changes in the clutch stroke position, the solid line indicates the piston position detected by the stroke sensor (sensor-detected stroke position), and the dotted chained line indicates the actual clutch stroke position. As shown, although the piston position is not changing, the clutch stroke position is changing in the clutch disengaging direction with volume expansion of the working oil. In this case, as described above, without the clutch disengaging operation being performed, the stroke detection position detected by the stroke sensor corresponds to the position in the clutch engaged state, and control to reduce the number of engine revolutions is not started. That is, with control to reduce the number of engine revolutions left unperformed, the clutch stroke position actually moves in the disengaging direction, and due to the engine load being reduced, an increase in the number of engine revolutions occurs (see the line indicating the change in the number of engine revolutions in FIG. 11). Also, as for the number of revolutions of the input shaft of the transmission, although the number of engine revolutions is increased as described above, because the clutch is moving in the disengaging direction, the amount of power transmission is very small and gradually decreases.

Problems with a "Pressure-Engaged Type" of Automatic Clutch

With the above "pressure-engaged type" of automatic clutch, when volume expansion of the working oil occurs when the automobile begins to move or during creeping travel, the oil pressure on the diaphragm spring increases, the clutch stroke position is further to the side of the engaging direction than the appropriate stroke position. Therefore, there is a possibility that the load on the engine will become too large and thus a sudden drop in the number of engine revolutions will occur, leading to an engine stall. This is because, in this type of automatic clutch, according to an increase in the amount of accelerator operation (the amount that an accelerator pedal is depressed) by the driver, control is performed to gradually displace the clutch in the engaging direction. More specifically, this is because although the accelerator has been operated only slightly up to present so that the number of engine revolutions is comparatively low (for example, corresponding to the number of revolutions when idling), due to the above working oil volume expansion, the clutch is stroked to the side of the engaging direction, and thus the load on the engine becomes too large.

As described above, in both the "pressure-disengaged type" and "pressure-engaged type" of automatic clutch, in a condition in which volume expansion of the working oil has occurred, it is difficult to obtain an appropriate clutch stroke position, so there is a possibility that problems such as worsened drivability will occur.

The present invention was made in view of the foregoing points, and it is an object thereof to provide an automatic clutch with which it is possible to appropriately obtain a clutch stroke position even when volume expansion occurs in the operation oil, thus insuring high reliability.

Solution to Problem

Principles of Solution

The solving principle of the invention devised in order to achieve the above object is that volume expansion of the working oil (working fluid) for operating the automatic clutch is observed, and in a condition in which this volume expansion occurs, the clutch stroke position is adjusted based on the number of revolutions of the input side or the output side of the clutch mechanism, i.e. the number of engine revolutions or the number of wheel revolutions, for example. Specifically, the clutch stroke position is corrected such that this number of revolutions returns to the state prior to occurrence of the adverse effect caused by the working oil volume expansion, and thus an appropriate power transmission state is obtained.

Means of Solution

Specifically, the invention presumes an automatic clutch control apparatus configured with a clutch mechanism that is disposed between a drive source and a transmission, and due to a clutch stroke position changing, engages and disengages the drive source and the transmission with each other; a fluid pressure generating means that generates an working fluid pressure for changing the clutch stroke position of the clutch mechanism, and causes the working fluid pressure to act on the clutch mechanism via a fluid pressure acting path; and a stroke position detecting means for detecting the clutch stroke position of the clutch mechanism by detecting the operating position of the fluid pressure generating means; in which based on the clutch stroke position detected with the stroke position detecting means, the operating position of the fluid pressure generating means is adjusted to change the clutch stroke position of the clutch mechanism. This automatic clutch control apparatus is provided with a temperature change amount recognizing means, a revolutions detecting means, and a fluid pressure control means. The temperature change amount recognizing means detects or estimates an amount of change in the temperature of the working fluid. The revolutions detecting means detects the number of revolutions of an input side or an output side of the clutch mechanism. The fluid pressure control means, when the amount of change in the temperature of the working fluid that has been detected or estimated with the temperature change amount recognizing means has reached a predetermined control switching temperature change amount, controls operation of the fluid pressure generating means based on the number of revolutions of the input side or the output side of the clutch mechanism detected with the revolutions detecting means. The drive source referred to here is for example an engine (internal combustion engine), and working oil is an example of the working fluid. Also, the number of engine revolutions is an example of the number of revolutions of the input side of the clutch mechanism, and the number of input shaft revolutions of the transmission and the number of revolutions of a drive wheel are examples of the number of revolutions of the output side of the clutch mechanism.

According to these specific matters, first, in an ordinary engaging/disengaging operation of an automatic clutch, the operating position (for example, the position of a piston within a clutch master-cylinder for generating oil pressure) of a fluid pressure generating means is detected with a stroke position detecting means, and while recognizing the present clutch stroke position, the operating position of the fluid pressure generating means is adjusted. Thus, by working fluid pressure generated with the fluid pressure generating means acting on a clutch mechanism via a fluid pressure acting path to change the clutch stroke position of the clutch mechanism, it is possible, for example, in connection with a gearshift operation of a transmission, to switch between a state in which a drive source and the transmission are disengaged from each other and a state in which the drive source and the transmission are engaged with each other. Also, when the automobile begins to move or during creeping travel, a half-engaged state (a so-called half-clutch state) is established due to the clutch stroke position being adjusted.

In a condition in which this sort of automatic clutch operation is being performed, in a condition in which volume expansion of the working fluid occurs due to an increase in the temperature of the working fluid, the occurrence of volume expansion is recognized by detection or estimation of the amount of the change in temperature (amount of temperature increase) of the working fluid by the temperature change amount recognizing means. When the amount of change in the temperature of the working fluid has reached a predetermined control switching temperature change amount, i.e., when a condition in which volume expansion of the working fluid is occurring has been recognized due to a temperature change, a fluid pressure control means controls operation of the fluid pressure generating means based on the number of revolutions of an input side or an output side of the clutch mechanism detected by a revolutions detecting means. That is, instead of control of the fluid pressure generating means based on the clutch stroke position detected with the stroke position detecting means, the fluid pressure control means performs control based on the number of revolutions. Thus, control of the fluid pressure generating means is performed without using clutch stroke position information from the stroke position detecting means, which has low reliability because volume expansion is occurring in the working fluid, and for example, the clutch stroke position is corrected so as to return to the state prior to the occurrence of volume expansion in the working fluid. As a result, adverse effects of volume expansion of the working fluid are eliminated, so it is possible to obtain an appropriate clutch stroke position.

The following can be given as a specific example of a configuration in which control of operation of a fluid generating means is performed with the fluid pressure control means.

First, a specific configuration when the invention is applied to an automatic clutch provided with the above "pressure-disengaged type" of clutch mechanism is as follows.

The above clutch mechanism is configured so that when an working fluid pressure has been received from the fluid pressure generating means, the clutch mechanism disengages the drive source and the transmission from each other, and when the working fluid pressure from the fluid pressure generating means is released, engages the drive source and the transmission with each other. Furthermore, a configuration is adopted in which the fluid pressure control means, when the amount of change in the temperature of the working fluid that has been detected or estimated with the temperature change amount recognizing means has reached a predetermined control switching temperature change amount, changes the clutch stroke position in the direction that the drive source and the transmission engage with each other, such that the number of revolutions of the input side or the output side of the clutch mechanism detected with the revolutions detecting means returns to the number of revolutions before volume expansion accompanying the change in the temperature of the working fluid occurred.

On the other hand, a specific configuration when the invention is applied to an automatic clutch provided with the above "pressure-engaged type" of clutch mechanism is as follows. The above clutch mechanism is configured so that when an working fluid pressure has been received from the fluid pressure generating means, the clutch mechanism engages the drive source and the transmission with each other, and when the working fluid pressure from the fluid pressure generating means is released, disengages the drive source and the transmission from each other. Furthermore, a configuration is adopted in which the fluid pressure control means, when the amount of change in the temperature of the working fluid that has been detected or estimated with the temperature change amount recognizing means has reached a predetermined control switching temperature change amount, changes the clutch stroke position in the direction that the drive source and the transmission disengage from each other, such that the number of revolutions of the input side or the output side of the clutch mechanism detected with the revolutions detecting means returns to the number of revolutions before volume expansion accompanying the change in the temperature of the working fluid occurred.

That is, in an automatic clutch provided with the above "pressure-disengaged type" of clutch mechanism, in a condition in which volume expansion occurs due to an increase in the temperature of the working fluid, the clutch stroke position is moved in the disengaging direction from the appropriate stroke position. Consequently, there is much slippage of the clutch, so rotational drive power from the engine is not adequately transmitted to the transmission side. Thus, there is a possibility this will lead to problems such as that there is poor starting movement or poor acceleration when the automobile begins to move, or poor creeping travel in the case of creeping travel, and the amount of friction of the clutch disk increases. With this solving means, this sort of condition is inferred from the amount of change in the temperature of the working fluid, and when there is an working fluid temperature increase, the number of revolutions (the number of revolutions of an input side or an output side of the clutch mechanism) prior to occurrence of volume expansion of the working fluid that accompanies the temperature increase is set as a target number of revolutions, and the clutch stroke position is changed in the direction that the drive source and the transmission engage with each other. Thus, there is little slippage of the clutch, so rotational drive power from the engine is adequately transmitted to the transmission side, so good performance in starting movement and acceleration when the automobile begins to move, and good creeping travel performance in the case of creeping travel, are obtained. Furthermore, it is possible to suppress the amount of friction of the clutch disk.

Also, in an automatic clutch provided with the above "pressure-engaged type" of clutch mechanism, in a condition in which volume expansion occurs due to an increase in the temperature of the working fluid, the clutch stroke position is moved in the engaging direction from the appropriate stroke position. Therefore, there is a possibility that the load on the engine will become too large when the vehicle begins to move or during creeping travel and so a sudden drop in the number of engine revolutions will occur, leading to an engine stall. With this solving means, this sort of condition is inferred from the amount of change in the temperature of the working fluid, and when there is an working fluid temperature increase, the number of revolutions (the number of revolutions of an input side or an output side of the clutch mechanism) prior to occurrence of volume expansion of the working fluid that accompanies the temperature increase is set as a target number of revolutions, and the clutch stroke position is changed in the direction that the drive source and the transmission disengage from each other. Thus, by lightening the load on the engine it is possible to avoid engine stalls, and it is possible to obtain good performance when starting movement and good creeping travel performance during creeping travel.

A specific example of operation to detect the amount of change in the temperature of the working fluid with the temperature change amount recognizing means is as follows. That is, the fluid pressure generating means is configured such that a piston is movably stored inside of a clutch master cylinder, and working fluid pressure that is caused to act on the clutch mechanism is changed with movement of this piston, and a reservoir tank is connected to the clutch master cylinder, and in a state in which the piston has moved forward to a position where the fluid pressure acting path and the reservoir tank are not in communication, the working fluid pressure is generated with the fluid pressure acting path as a closed circuit. The temperature change amount recognizing means is configured so as to detect or estimate the amount of change in the temperature of the working fluid in a period during which the state in which the fluid pressure acting path is a closed circuit continues, and is configured such that the operation to detect or the operation to estimate the amount of change in the temperature of the working fluid is cancelled when the piston has withdrawn to a position where the fluid pressure acting path and the reservoir tank are in communication.

That is, the temperature change amount recognizing means detects or estimates the amount of change in the temperature of the working fluid in a period during which the fluid pressure acting path is a closed circuit. This is because when the piston has withdrawn so that the fluid pressure acting path and the reservoir tank are in communication, i.e., the fluid pressure acting path is opened to the reservoir tank, a condition is established in which adverse effects due to volume expansion that accompanies an increase in the temperature of the working fluid do not occur (a condition does not occur in which a release bearing is not pressed to a diaphragm spring side to the extent of the volume expansion), and thus, a control operation according to the invention is executed only during a period in which a condition is maintained in which it is possible that adverse effects due to the volume expansion will occur. As a result, it is possible to avoid a situation in which unnecessary changing of the clutch stroke is performed by the fluid pressure control means although the fluid pressure acting path is opened to the reservoir tank and a condition is established in which the above problems will not occur even if the temperature of the working oil increases. Thus, it is possible to achieve greater reliability of the control operation according to the invention.

Following is a specific example configuration of control of a fluid generating means by a fluid pressure control means in a case where an operation to detect the amount of change in the temperature of the working fluid is performed with the temperature change amount recognizing means in this manner. First, the revolutions detecting means is configured to detect the number of revolutions of the input side or the output side of the clutch mechanism at the time when the fluid pressure acting path becomes a closed circuit. Furthermore, the fluid pressure control means is configured to, when the amount of change in the temperature of the working fluid that has been detected or estimated with the temperature change amount recognizing means has reached a predetermined control switching temperature change amount, set the number of revolutions detected with the revolutions detecting means as a target number of revolutions, and control operation of the fluid pressure generating means such that the number of revolutions of the input side or the output side of the clutch mechanism matches the target number of revolutions.

Thus, the clutch stroke position is adjusted so as to return the number of revolutions of the input side or the output side of the clutch mechanism to the number of revolutions just before a state in which it is possible that an adverse affect due to volume expansion of the working fluid will occur (a state in which the piston position makes the fluid pressure acting path into a closed circuit), and therefore it is possible to obtain an appropriate clutch stroke position.

Advantageous Effects of Invention

In the present invention, volume expansion of the working fluid for operating the automatic clutch is observed, and in a condition in which this volume expansion occurs, the clutch stroke position is adjusted based on the number of revolutions of the input side or the output side of the clutch mechanism, i.e. the number of engine revolutions or the number of wheel revolutions, for example. For example, when the clutch stroke position has been displaced to the clutch disengaging side due to the effect of the volume expansion, adjustment to the clutch engaging side is performed. Thus, even when volume expansion occurs in the working fluid, it is possible to appropriately obtain a clutch stroke position, and thus it is possible to provide an automatic clutch capable of insuring high reliability.

BRIEF DESCRIPTION OF DRAWINGS

FIG. 1 shows the overall configuration of the powertrain of a vehicle and a control system of that powertrain according to an embodiment of the invention.

FIG. 2 shows the overall configuration of an automatic clutch and a transmission.

FIG. 3 is a cross-sectional view that shows the internal configuration of the automatic clutch.

FIGS. 4A to 4D show changes in piston position within a clutch master cylinder; FIG. 4A shows the piston position in a clutch disengaged state, FIG. 4B shows the piston position in a clutch engaged state, FIG. 4C shows the piston position in a state during creeping travel, and FIG. 4D shows the piston position at the point in time when the interior of the clutch master cylinder and a reservoir tank are no longer in communication.

FIG. 5 is a perspective view that shows the configuration of part of a shift lever of a shift apparatus.

FIG. 6 is a block diagram that shows the configuration of a control system such as an ECU.

FIG. 7 is a flowchart that shows a procedure of a clutch control operation when working oil temperature is changed.

FIG. 8 is a timing chart that shows an example of a clutch control operation when working oil temperature is changed according to a first embodiment, and shows changes in coolant temperature, changes in clutch stroke position, and changes in the number of engine revolutions.

FIG. 9 is a timing chart that corresponds to FIG. 8, according to a second embodiment.

FIG. 10 shows, in the "pressure-disengaged type" of automatic clutch, an example of changes in the clutch stroke position in normal operation in which volume expansion of the working oil has not occurred, and corresponding changes in the number of engine revolutions and the number of transmission input shaft revolutions.

FIG. 11 shows, in the above "pressure-disengaged type" of automatic clutch, an example of changes in the clutch stroke position in a condition in which volume expansion is occurring in the working oil, and corresponding changes in the number of engine revolutions and the number of transmission input shaft revolutions.

EXPLANATION OF REFERENCE

1 Engine (drive source)
2 Automatic clutch
2A Clutch mechanism
3 Transmission
202 Hydraulic control apparatus (fluid pressure generating means)
210 Clutch master cylinder
210a Piston
212b Stroke sensor (stroke position detecting means)
214 Reservoir tank
401 Engine revolutions sensor (revolutions detecting means)
410 coolant temperature sensor (temperature change amount recognizing means)

BEST MODE FOR CARRYING OUT THE INVENTION

Following is a description of embodiments of the invention based on the drawings. In the embodiments of the invention described below, a case is described in which an automatic clutch according to the invention is combined with an automatic manual transmission (AMT).

First Embodiment

First, a first embodiment will be described. This is an embodiment of a case in which the invention is applied to a "pressure-disengaged type" of automatic clutch, in which a clutch disengaged state is established when using oil pressure (working fluid pressure) from a clutch actuator (when applying pressure), and a clutch engaged state is established when oil pressure is released.

A vehicle powertrain according to this embodiment will be described with reference to FIG. 1. Control of this powertrain is realized by a program executed by an ECU 100 shown in FIG. 1. The ECU 100, more specifically, is configured from an engine ECU, an AMT-ECU, and the like, and these ECUs are connected so as to be capable of establishing communications (CAN communications) with each other.

As shown in FIG. 1, the vehicle powertrain is provided with an engine (drive source) 1, an automatic clutch 2, a transmission 3, and the above ECU 100. Following is a description of the engine 1, the automatic clutch 2, the transmission 3, and the ECU 100.

Engine 1

The engine 1 is configured with a gasoline engine, a diesel engine, or the like, and a crank shaft 11 that serves as an output shaft of the engine 1 is linked to a flywheel 21 (FIG. 2) of the automatic clutch 2. The number of revolutions (number of engine revolutions NE) of the crank shaft 11 is detected by an engine revolutions sensor 401.

The amount of air drawn into the engine 1 is adjusted by an electronically controlled throttle valve 12. The throttle valve 12 is capable of electronically controlling the throttle opening degree independent of accelerator pedal operation by the driver, and the opening degree (throttle opening degree) is detected by a throttle opening degree sensor 402.

The throttle opening degree of the throttle valve 12 is driven and controlled by the ECU 100. Specifically, the throttle opening degree of the throttle valve 12 is controlled such that an optimal intake air amount (target intake air amount) is obtained according to the operating state of the engine 1 such as the number of engine revolutions NE detected by the engine revolutions sensor 401, and the amount that the driver is depressing the accelerator pedal (accelerator opening degree). More specifically, the actual throttle opening degree of the throttle valve 12 is detected using the throttle opening degree sensor 402, and feedback control of a throttle motor 13 of the throttle valve 12 is performed such that the actual throttle opening degree matches the throttle opening degree (target throttle opening degree) at which the target air intake amount is obtained.

Automatic Clutch 2

The specific configuration of the automatic clutch 2 will be described with reference to FIGS. 2 and 3.

The automatic clutch 2 is provided between the crank shaft 11 of the engine 1 and an input shaft 31 of the transmission 3, and as necessary, establishes an engaged state (see FIG. 2) of the crank shaft 11 and the input shaft 31 in which power transmission is possible, a disengaged state in which power transmission is not possible, or a half-engaged state (so-called half-clutch) that accompanies slippage.

The automatic clutch 2, as shown in FIG. 2, is provided with a clutch mechanism 2A having a commonly known single plate dry structure. This clutch mechanism 2A is mainly provided with a clutch disk 22, a pressure plate 23, and a diaphragm spring 24.

The clutch disk 22 is spline-fitted to the end of the input shaft 31 of the transmission 3 such that it can revolve together with the input shaft 31 and can be displaced in the axial direction, and thus is disposed facing the flywheel 21 fixed to the back end of the crank shaft 11 of the engine 1.

The pressure plate 23 is composed of a ring-like plate disposed facing the clutch disk 22, and is installed to an outer circumferential portion of the diaphragm spring 24.

In its natural state (a state in which external force is not acting), the diaphragm spring 24 is pressed against the pressure plate 23 so as to move the pressure plate 23 near the flywheel 21, and thus establishes the clutch engaged state in which the clutch disk 22 is pressed in contact with the flywheel 21 by the pressure plate 23. When the diaphragm spring 24 has been reversed due to the inner diameter side of the diaphragm spring 24 being pressed against by a release bearing 203 described below, the pressure plate 23 is pulled away to the side that it moves away from the flywheel 21, and thus the clutch disk 22 is pulled away from the flywheel 21, establishing the clutch disengaged state.

A clutch operation apparatus 200 that serves as an actuator for operating the clutch mechanism 2A, as necessary, operates so as to establish the above-described engaged state, disengaged state, and half-engaged state of the clutch mechanism 2A by displacing the pressure plate 23 of the clutch mechanism 2A in the axial direction, and as shown in FIG. 2, mainly is provided with a hydraulic clutch release apparatus 201, and a hydraulic control apparatus (fluid pressure generating means) 202.

As shown in FIG. 3, the hydraulic clutch release apparatus 201 displaces the release bearing 203, that is brought into contact with the inner diameter portion of the diaphragm spring 24 of the clutch mechanism 2A, in the axial direction on the outer diameter side of the input shaft 31.

The hydraulic clutch release apparatus 201 has an outer shape that is approximately cylindrical, and is provided concentric with the input shaft 31 of the transmission 3 on the outer circumferential side of the input shaft 31. As shown in FIG. 3, the hydraulic clutch release apparatus 201 has an inner sleeve 204, an outer sleeve 205, a piston 206, a preload spring 207, and the release bearing 203.

The inner sleeve 204 is disposed surrounding the outer circumferential side of the input shaft 31 of the transmission 3 in a state of non-contact, and at the base end side in the axial direction of the inner sleeve 204, a round plate portion 204a is provided that extends to the outside in the radial direction, as an installation piece installed to a transmission case (not shown).

The outer sleeve 205 is disposed surrounding the outer circumferential side of the inner sleeve 204 so as to form a ring-shaped space. On the base end side in the axial direction of the inner sleeve 205, a thick large diameter portion 205a is provided that is fixed to the unshown transmission case, and at the tip end side in the axial direction a bent piece 205b is provided that is bent toward the inside in the radial direction. The thick large diameter portion 205a is provided with an oil passageway 205c for sending/receiving working oil to/from a clutch master cylinder 210 (see FIG. 2) of the hydraulic control apparatus 202.

The piston 206 is fitted into the ring-shaped space between the inner sleeve 204 and the outer sleeve 205 such that it can be displaced in the axial direction. An inner wheel inner diameter side of the release bearing 203 is fitted to an outer diameter side thin small diameter portion on the tip end side in the axial direction of the piston 206. The release bearing 203 is latched with a plate spring 208.

The preload spring 207 is provided in a compressed state between the wall face of the thick large diameter portion 205a of the outer sleeve 205 and the end face of the inner wheel of the release bearing 203, and with its elastic restorative force, is biased so as to cause the end face of the release bearing 203 to always be in contact with the inner diameter side of the diaphragm spring 24, thus eliminating rattling. A spring seat 207a is provided between the preload spring 207 and the inner wheel end face of the release bearing 203.

A ring-shaped oil pressure compartment 209 that is surrounded by the inner sleeve 204, the outer sleeve 205, and the piston 206 is hermetically sealed from the outside with a first seal ring 209A and a second seal ring 209B. The first seal ring 209A is installed to the tip end side in the axial direction of the outer sleeve 205, and positioned in the axial direction with a sleeve 209C. The second seal ring 209B is installed to an inner end side in the axial direction of the piston 206.

The hydraulic control apparatus 202, as necessary, applies working oil pressure to the oil pressure compartment 209 of the hydraulic clutch release apparatus 201 to put the automatic clutch 2 in the disengaged state, releases application of working oil pressure to the oil pressure compartment 209 to put the automatic clutch 2 in the engaged state, or establishes the half-engaged state that accompanies slippage, and includes the clutch master cylinder 210, a clutch actuator 211, and a power transmission mechanism 212.

The clutch master cylinder 210 is connected to the oil pressure compartment 209 of the hydraulic clutch release apparatus 201 via an oil pressure tube 213 and the oil passageway 205c of the outer sleeve 205. Specifically, a piston 210a is stored in the clutch master cylinder 210 such that the piston 210a can move back and forth, and oil pressure that is generated with back and forth movement of the piston 210a along with operation of the clutch actuator 211 described below is caused to act in the oil pressure compartment 209 via the oil pressure tube 213 and the oil passageway 205c of the outer sleeve 205. That is, a fluid pressure acting path is configured with the oil pressure tube 213, the oil passageway 205c, and the oil pressure compartment 209.

A reservoir tank 214 is connected at a center portion in the axial direction (the left-right direction in FIG. 2) of the clutch master cylinder 210. Therefore, as shown for example in FIG. 4A, in a state in which the piston 210a has advanced past the connection position of the reservoir tank 214 to the oil pressure tube 213 side, the oil passageway 205c and the reservoir tank 214 are blocked, so the oil path from the clutch master cylinder 210 to the oil pressure compartment 209 becomes a closed space (a closed circuit), and thus it becomes possible that with forward movement of the piston 210a, oil pressure will act on the oil pressure compartment 209 from the oil passageway 205c. On the other hand, as shown for example in FIG. 4B, in a state in which the piston 210a has withdrawn past the connection position of the reservoir tank 214 to the power transmission mechanism 212 side, the oil passageway 205c is open to the reservoir tank 214, so the action of oil pressure on the oil passageway 205c and the oil pressure compartment 209 is released.

The clutch actuator 211 is an electric motor, for example. The power transmission mechanism 212 decelerates revolving power generated with the clutch actuator 211, and converts that revolving power to driving power that linearly displaces the piston 210a of the clutch master cylinder 210 back and forth.

The detailed configuration of the power transmission mechanism 212 is not shown, but in this configuration a plurality of gears or the like are combined, and a push rod 212a that is linked to the piston 210a of the clutch master cylinder 210 is provided in the linear driving power output portion.

Although commonly known, following is a simplified description of basic operation with the above automatic clutch 2.

Note that in this automatic clutch 2, it is prescribed in advance that when a neutral position has been selected with a shift lever 9a described below, the disengaged state is established. Also, it is prescribed in advance that the automatic clutch 2 will be put in the disengaged state also in a state in which a traveling vehicle is stopped and a traveling gear is maintained.

When the shift lever 9a in a manual operating mode is temporarily changed from the neutral position to a traveling shift position (for example, first gear), gearshift processing of the transmission 3 is performed such that a traveling gear that corresponds to the selected traveling shift position is established.

The gearshift processing of the transmission 3 is performed by controlling an unshown shift selection actuator with the ECU 100. This gearshift processing of the transmission 3 will be described below.

After the gearshift processing, while the vehicle is traveling forward, if the shift position is changed to another traveling shift position (for example, second gear) with the shift lever 9a, the automatic clutch 2 is temporarily put in the disengaged state before performing gearshift processing of the transmission 3.

As processing performed when establishing the disengaged state, by rotationally driving the clutch actuator 211 of the hydraulic control apparatus 202 in a predetermined direction, the piston 210a of the clutch master cylinder 210 is pressed against, and thus, as shown in FIG. 4A, the piston 210a is advanced past the connection position of the reservoir tank 214 to the oil pressure tube 213 side. Therefore a state is established in which the oil passageway 205c and the reservoir tank 214 are blocked, so oil pressure is generated within the clutch master cylinder 210.

The movement stroke of the push rod 212a of the power transmission mechanism 212 is detected with a stroke sensor (stroke position detecting means) 212b, and based on this detection output, by performing feedback control of the clutch actuator 211, the pushing stroke of the piston 210a of the clutch master cylinder 210 is adjusted. Note that with the automatic clutch 2 in this embodiment, a stroke sensor is not provided in the vicinity of the release bearing 203, and the clutch stroke position is estimated based on the detection signal of the stroke sensor 212b.

By pressing of the piston 210a, the working oil pressure within the clutch master cylinder 210 is applied to the oil pressure compartment 209 of the hydraulic clutch release apparatus 201 via the oil pressure tube 213 and the oil path 205c, and thus the piston 206 of the hydraulic clutch release apparatus 201 is pushed to the flywheel 21 side.

Therefore, the release bearing 203 reverses the diaphragm spring 24, so the pressure plate 23 is pulled away from the flywheel 21, and thus crank shaft 11 of the engine 1 and the input shaft 31 of the transmission 3 are separated, so the automatic clutch 2 is put in the disengaged state.

After establishing such a clutch disengaged state, gearshift processing of the transmission 3 is performed so as to establish the shift position that has been changed with the shift lever 9a.

When the requested shift position is established with this gearshift processing, the automatic clutch 2 is returned to a connected state (see FIG. 2).

Processing to switch to this connected state is as follows. By rotationally driving the clutch actuator 211 of the hydraulic control apparatus 202 in the direction opposite to that stated above, pressure on the piston 210a of the clutch master cylinder 210 is released, and thus, as shown in FIG. 4B, the piston 210a is withdrawn past the connection position of the reservoir tank 214 to the power transmission mechanism 212 side. Therefore a state is established in which the oil passageway 205c and the reservoir tank 214 are in communication, so oil pressure that was generated within the clutch master cylinder 210 is released.

In this case as well, the movement stroke of the push rod 212a of the power transmission mechanism 212 is detected by the stroke sensor 212b.

Thus, with the elastic restorative force of the diaphragm spring 24, the release spring 203 is pushed back, and the piston 206 of the hydraulic clutch release apparatus 201 is pulled back inside, so the working oil within the oil pressure compartment 209 is returned to the clutch master cylinder 210 and the reservoir tank 214 via the oil passageway 205c and the oil pressure tube 213.

At the same time, with the elastic restorative force of the diaphragm spring 24, the pressure plate 23 is pushed to the flywheel 21 side, so the clutch engaged state is established in which the crank shaft 11 of the engine 1 and the input shaft 31 of the transmission 3 are connected.

Note that the automobile according to this embodiment is also capable of creeping travel. This creeping travel is a state in which the automobile is caused to travel in a so-called half-clutch state, in which the advancement/withdrawal position of the piston 210a is adjusted so that the oil pressure generated with the clutch master cylinder 210 assumes a value at which the half-clutch state is possible. Specifically, by rotationally driving the clutch actuator 211 of the hydraulic control apparatus 202 in a predetermined direction, the piston 210a of the clutch master cylinder 210 is pressed against, and thus, as shown in FIG. 4C, the piston 210a is advanced past the connection position of the reservoir tank 214 to the oil pressure tube 213 side. Therefore a state is established in which the oil passageway 205c and the reservoir tank 214 are blocked, so oil pressure that was generated within the clutch master cylinder 210 is generated. Here, the advancement position of the piston 210a is slightly to the rear of the advancement position in the clutch engaged state described above (the position indicated in FIG. 4A).

Therefore, the working oil pressure within the clutch master cylinder 210 is applied to the oil pressure compartment 209 of the hydraulic clutch release apparatus 201 via the oil pressure tube 213 and the oil path 205c, and thus the piston 206 of the hydraulic clutch release apparatus 201 is pushed slightly to the flywheel 21 side.

Therefore, the pressure plate 23 is slightly pulled away from the flywheel 21, thus establishing a creeping travel state by establishing a half-engaged state that accompanies slippage between the flywheel 21 and the clutch disk 22.

Transmission 3

The transmission 3 is configured like an ordinary manual transmission, such as a parallel gear transmission that, for example, has five forward gears and one reverse gear. The input shaft 31 of the transmission 3 is linked to the clutch disk 22 of the above automatic clutch 2 (see FIG. 2). Also, as shown in FIG. 1, revolution of an output shaft 32 of the transmission 3 is transmitted to a drive wheel 7 via a propeller shaft 4, a differential gear 5, and a drive shaft 6, for example.

The number of revolutions of the input shaft 31 of the transmission 3 is detected with an input shaft revolutions sensor 403. The number of revolutions of the output shaft 32 of the transmission 3 is detected with an output shaft revolutions sensor 404. It is possible to determine the present gear based on a ratio (number of output revolutions/number of input revolutions) of the number of revolutions obtained from the output signals of the input shaft revolutions sensor 403 and the output shaft revolutions sensor 404.

The transmission 3 of this embodiment is provided with a gearshift operation apparatus 300 that has, for example, a shift fork and a select-and-shift shaft, and as a whole, constitutes an automatic manual transmission (AMT) that automatically performs gearshift operations.

The gearshift operation apparatus 300 is provided with, for example, a hydraulic selection actuator that performs a selection direction operation (selection operation), a hydraulic shift actuator that performs a shift direction operation (shift operation), and an oil pressure circuit that controls the oil pressure of working oil supplied to these actuators. A solenoid control signal (oil pressure command value) is supplied from the ECU 100 to the oil pressure circuit of the gearshift operation apparatus 300, driving control is independently performed for each of the selection actuator and the shift actuator based on that solenoid control signal, and thus selection operations and shift operations of the transmission 3 are automatically executed. This configuration is widely known, so a description thereof is omitted here.

On the other hand, a shift apparatus 9 is disposed near a driver seat of the vehicle. As shown in FIG. 5, a shift lever 9a is provided so as to be displaceable in the shift apparatus 9. Also, a reverse (R) position, a neutral (N) position, a drive (D) position, and a sequential (S) position are set in the shift apparatus 9, and the driver can displace the shift lever 9a to a desired gearshift position. The shift positions, namely the reverse (R) position, the neutral (N) position, the drive (D) position, and the sequential (S) position (including also a "+" position and a "−" position described below), are detected by a shift position sensor 406 (see FIG. 1).

Below, the conditions in which those gearshift positions are selected, and the manner of operation of the transmission 3 at that time, will be described with respect to each gearshift position ("N position", "R position" "D position", and "S position").

The "N position" is a position selected when disengaging the link between the input shaft 31 and the output shaft 32 of the transmission 3. When the shift lever 9a is operated to the "N position", a state is established in which gear pairs of an input side gear group and an output side gear group of the transmission 3 do not bite together, and thus power transmission with the gear train of each gear is cut off.

The "R position" is a position selected when moving the vehicle in reverse. When the shift lever 9a is operated to the "R position", the transmission 3 is switched to the reverse gear.

The "D position" is a position selected when moving the vehicle forward. When the shift lever 9a is operated to the "D position", according to the state of operation or the like of the vehicle, gearshift control of the plurality of forward gears (five forward gears) of the transmission 3 is automatically performed. That is, gearshift operations in automatic mode are performed.

The "S position" is a position selected when the driver manually performs gearshift operations of the plurality of forward gears (five forward gears), and the "−" position and the "+" position are provided front-to-back in the "S position". The shift lever 9a is operated to the "+" position when performing an upshift, and operated to the "−" position when performing a downshift.

When the shift lever 9a is in the S position, when the shift lever 9a is operated to the "+" position or the "−" position with the S position serving as a neutral position, the forward gear of the transmission 3 is shifted up or down. Specifically, each time that the shift lever 9a is operated to the "+" position, the gear increases by one gear (for example, 1st to 2nd to . . . 5th). On the other hand, each time that the shift lever 9a is operated to the "−" position, the gear decreases by one gear (for example, 5th to 4th to . . . 1st).

A configuration may additionally be adopted in which, in addition to the above shift lever 9a, a paddle switch for upshifting (operating switch to the "+" position) and a paddle switch for downshifting (operating switch to the "−" position) are provided on a handle or a steering column, for example, and when the shift lever 9a is operated in the S position, each time that the paddle switch for upshifting is operated, the gear increases by one gear, and each time that the paddle switch for downshifting is operated, the gear decreases by one gear. Also, a configuration may be adopted in which the above shift lever 9a is not provided, and manual gearshift operation is performed only with paddle switches. In this case, an automatic mode switch for selecting an "automatic mode" and a reverse switch for selecting "reverse" are provided on an instrument panel or on a console panel. Also, as necessary, a neutral switch for selecting "neutral" may be provided.

ECU 100

The ECU 100, as shown in FIG. 6, is provided with a CPU 101, a ROM 102, a RAM 103, a backup RAM 104, and the like.

Stored in the ROM 102 are, for example, various control programs, and maps referred to when executing those various control programs. The CPU 101 executes computational processing based on the various control programs and maps stored in the ROM 102. The RAM 103 is a memory that temporarily stores the results of computation by the CPU 101, data that has been input from various sensors, and the like. The backup RAM 104 is a nonvolatile memory that stores, for example, data from the RAM 103 that should be saved when the engine 1 is stopped.

Via a bus 107, the CPU 101, the ROM 102, the RAM 103, and the backup RAM 104 are connected to each other, and also connected to an input interface 105 and an output interface 106.

Connected to the input interface 105 of the ECU 100 are, for example, the engine revolutions sensor (revolutions detecting means) 401, a throttle opening degree sensor 402, an input shaft revolutions sensor 403, an output shaft revolutions sensor 404, an accelerator opening degree sensor 405 that detects the opening degree of an accelerator pedal 8, a shift position sensor 406 that detects the shift position of the shift apparatus 9, a brake pedal sensor 407, a wheel speed sensor 408 that detects the rotational speed of a drive wheel, an acceleration sensor 409 that detects acceleration of the vehicle, a coolant temperature sensor (temperature change amount recognizing means) 410 that detects the temperature of coolant of the engine 1, a transmission oil temperature sensor 411 that detects the temperature of oil in the transmission 3, and the stroke sensor 212b, and signals from these sensors are input to the ECU 100.

Connected to the output interface 106 of the ECU 100 are, for example, the throttle motor 13 that opens/closes the throttle valve 12, the clutch operation apparatus 200 of the automatic clutch 2, and the gearshift operation apparatus 300 of the transmission 3.

The ECU 100 executes various control of the engine 1, including control of the opening degree of the throttle valve 12 of the engine 1, based on the output signals of the various sensors above. Also, the ECU 100 outputs a control signal to the clutch operation apparatus 200 of the automatic clutch 2 when, for example, a gearshift of the transmission 3 is performed, thus causing the automatic clutch to perform the engaging operation and disengaging operation described above. Furthermore, the ECU 100, based on the output signals of the various sensors above, outputs a control signal (oil pressure command value) to the gearshift operation apparatus 300 of the transmission 3, thus performing gearshift control to switch gears of the transmission 3.

Operation of Clutch Control when Working Oil Temperature is Changed

Next is a description of a clutch control operation performed when working oil temperature is changed, this operation being a distinguishing feature of the present embodiment. With a conventional automatic clutch, when the temperature of the working oil has increased, that temperature increase is accompanied by volume expansion of the working oil, and even though the piston is not moving within the clutch master cylinder, to the extent of that volume expansion, the release bearing is pressed to the diaphragm spring side, so the clutch stroke changes in the direction of disengagement. Thus, in this condition problems occur such as an increase in the number of engine revolutions, poor starting movement or poor acceleration when the automobile begins to move, or poor creeping travel during creeping travel (a condition in which a predetermined creeping travel speed cannot be obtained), and an increase in the amount of friction of the clutch disk.

In this embodiment, even when this sort of working oil temperature increase has occurred, it is possible to appropriately adjust the clutch stroke.

Specifically, the amount of working oil temperature increase is observed during a period in which there is an obstruction between the clutch master cylinder 210 and the reservoir tank 214 (in other words, during a period in which the oil passageway 205c and the reservoir tank 214 are blocked, and in which the piston position of the clutch master cylinder 210 is to the front side of the connection position of the reservoir tank 214, as shown in FIGS. 4A, 4C, and 4D). This amount of working oil temperature increase is estimated from the coolant temperature detected with the coolant temperature sensor 410. Also, the number of engine revolutions at the point in time that there is an obstruction between the clutch master cylinder 210 and the reservoir tank 214 (for example, the time when the piston 210a in the position in FIG. 4B moves forward so that the state shown in FIG. 4D is established) is stored. When, without the clutch master cylinder 210 and the reservoir tank 214 being in communication, the amount of working oil temperature increase estimated from the coolant temperature has reached a predetermined amount (a control switching temperature change amount), it is determined that volume expansion of the working oil is occurring, so that a condition is established in which the number of engine revolutions is increased. Thus, the hydraulic control apparatus 202 is controlled to change the clutch stroke position of the clutch mechanism 2A to the engagement side, such that the number of engine revolutions returns to the stored number of engine revolutions (control operation of the hydraulic control apparatus 202 by fluid pressure control means).

Following is a more specific description of the control procedure, following the flowchart in FIG. 7. The clutch control operation routine shown in FIG. 7 is repeatedly executed in the ECU 100 at each instance of a predetermined time interval (for example, several milliseconds).

First, in Step ST1, a determination is made of whether or not the present state is one in which a gearshift operation is not being performed in the transmission 3 (non-gearshift operation state). For example, when the shift lever 9a is operated by the driver when in the manual mode, and a predetermined period of time is needed until the gearshift operation of the transmission 3 is completed, a determination is made of whether or not it is presently within that predetermined time period. In the automatic mode as well, a determination is made of whether or not it is presently in a predetermined time period needed from starting of the gearshift operation to completion of the gearshift operation.

When the transmission 3 is in non-gearshift operation and so the determination in Step ST1 was Yes, the routine moves to Step ST2, where a determination is made of whether or not the clutch master cylinder 210 is in a state of non-communication with the reservoir tank 214. This determination is performed from the movement position of the piston 210a recognized based on the detection signal of the stroke sensor 212b. That is, from this detection signal, when the movement position of the piston 210a is in the state shown in FIG. 4A, FIG. 4C, or FIG. 4D, the clutch master cylinder 210 is determined to, be in a state of non-communication with the reservoir tank 214, so the determination in Step ST2 is Yes. On the other hand, from this detection signal, when the movement position of the piston 210a is in the state shown in FIG. 4B, the clutch master cylinder 210 is determined to be in a state of communication with the reservoir tank 214, so the determination in Step ST2 is No.

When determined Yes in Step ST2, the routine moves to Step ST3, where a determination is made of whether or not in a condition in which a target number of engine revolutions (referred to below as target NE), described below, has been set. This target NE is set in below Step ST4.

When the target NE has not yet been set, in Step ST4, the present number of engine revolutions (referred to below as the present NE) is set as the target NE. That is, the number of engine revolutions when a determination of Yes was made in Step ST2 is set as the target NE.

On the other hand, when the target NE has already been set, a determination of Yes is made in Step ST3 and the routine moves to Step ST5. That is, in a case where the target NE has already been set in the prior instance of the routine, and the determination in Step ST3 has been made without this target NE being canceled, this already set target NE is maintained.

In a case where, in the operations of Steps ST2 to ST4, from a condition in which up to then (up to the previous instance of the routine) the clutch master cylinder 210 was in a state of communication with the reservoir tank 214 and so a determination of No was made in Step ST2, in the present instance of the routine, the clutch master cylinder 210 moved to a state of non-communication with the reservoir tank 214, the present NE at that point in time is set as the target NE. After this target NE has been temporarily set, until the target NE is cancelled (until cancelled in Steps ST10 or ST12 described below), the target NE is stored in the RAM 103, for example.

In a state in which the target NE has been set in this manner, the routine moves to Step ST5. In Step ST5, a determination is made of whether or not a temperature increase amount dT, described below, is presently being measured. Measurement of this temperature increase amount dT is started in below Step ST6.

If measurement of the temperature increase amount dT has not yet started, a determination of No is made in Step ST5, and in Step ST6, measurement of the temperature increase amount dT from that point in time is started. The temperature increase amount dT stated here is the amount of increase in the temperature of the coolant of the engine 1 detected with the coolant temperature sensor 410, and is used in order to estimate the amount of temperature increase of the working oil, and thus recognize whether or not volume expansion of the working oil is occurring. In this case, the amount of increase in the coolant temperature is measured from the time when a determination of Yes was made in Step ST2.

On the other hand, when measurement of the temperature increase amount dT is already started, i.e., when measurement of the temperature increase amount dT has already been started in the previous instance of the routine, and so the determination in Step ST5 has been made without canceling the operation to measure the temperature increase amount dT, measurement of the temperature increase amount dT is continued and the routine moves to Step ST7.

In Step ST7, a determination is made of whether or not the temperature increase amount dT has reached at least a predetermined value X. This predetermined value X is set to 10 degrees, for example. The predetermined value X is not limited to this, and is set based on testing or experience.

In a case where the temperature increase amount dT is less than the predetermined value X, it is determined that the amount of volume expansion of the working oil is not yet in the range that will adversely affect operation of the automatic clutch 2, and the above-described operation is repeated. That is, only in a case where a state is continuing in which a gearshift operation of the transmission 3 is not being performed and the clutch master cylinder 210 is in a state of non-communication with the reservoir tank 214, the target NE value continues to be stored, the temperature increase amount dT continues to be added up, and a determination is made of whether or not that value has reached at least the predetermined value X.

When the temperature increase amount dT is at least the predetermined value X, so that a determination of Yes is made in Step ST7, the routine moves to Step ST8, and the automatic clutch 2 is controlled such that the number of engine revolutions becomes the target NE. Specifically, volume expansion of the working oil occurs as its temperature increases, and the clutch stroke changes in the disengaging direction to the extent of that volume expansion, so the number of engine revolutions becomes higher (increases) as compared with the target NE. Thus, the clutch actuator 211 is controlled (using PID control, for example) such that the clutch stroke changes in the engaging direction.

After this control of the automatic clutch 2 toward the target NE is started, in Step ST9, a determination is made of whether or not the present number of engine revolutions (NE) matches the target NE, and when the number of engine revolutions (NE) has decreased to the target NE and so a determination of Yes is made in Step ST9, the routine moves to Step ST10, and as described above, the target NE that was set is cancelled, the measurement value of the temperature increase amount dT is reset, and then this routine ends.

On the other hand, when a determination of No is made in Step ST1, or a determination of No is made in Step ST2, the routine moves to Step ST11. That is, when a gearshift operation of the transmission 3 has been started, and thus the clutch master cylinder 210 has been placed in communication with the reservoir tank 214, the routine moves to Step ST11. In Step ST11, a determination is made of whether or not presently in a condition in which the target NE has been set. When not in a condition in which the target NE has been set, so that a determination of No is made in Step ST11, the routine ends here.

On the other hand, when at present the target NE has been set, the routine moves to Step ST12, where the set target NE is cancelled, the measurement value of the temperature increase amount dT is cancelled (discarded), and then this routine ends. This is operation in the case of a condition where, for example, while determining whether or not the temperature increase amount dT has reached at least the predetermined value X in Step ST7, a gearshift operation of the transmission 3 is performed so the clutch master cylinder 210 is put in communication with the reservoir tank 214, and due to the oil path from the clutch master cylinder 210 to the oil pressure compartment 209 being opened, the problems described above that accompany volume expansion do not occur.

FIG. 8 is a timing chart that shows an example of a clutch control operation when coolant temperature (the temperature for estimating the working oil temperature) is changed according to this embodiment, and shows the state of coolant temperature change (corresponding to the state of working oil temperature change), changes in clutch stroke position, and changes in the number of engine revolutions. In FIG. 8, the double-dotted chained line indicates the clutch stroke position that corresponds to the position of the piston 210a when the clutch master cylinder 210 is no longer in communication with the reservoir tank 214.

FIG. 8 shows a case in which, after moving from the clutch engaged state to the creeping travel state, the temperature increase amount dT of the coolant has reached at least the predetermined value X. Such a case will be specifically described below.

First, from a state in which the clutch is engaged and the clutch master cylinder 210 is in communication with the reservoir tank 214 (the state shown in FIG. 4B), creeping travel is started, thus establishing a state in which the clutch master cylinder 210 is not in communication with the reservoir tank 214 (time T1 in FIG. 8; the clutch stroke position at this time is indicated by A). Then, the number of engine revolutions at this time is stored as the target NE.

When volume expansion due to an increase in the temperature of the working oil has occurred, although the position of the piston 210a detected with the stroke sensor 212b (the sensor-detected stroke position) has not changed, actually, the clutch stroke position has moved in the disengaging direction due to the working oil volume expansion (see the single-dotted chained line in FIG. 8).

Afterward, the automatic clutch 2 is controlled such that a condition in which the clutch master cylinder 210 is in non-communication with the reservoir tank 214 is maintained so that the coolant temperature progressively increases, and the number of engine revolutions approaches the target NE at the time that the temperature increase amount dT reaches at least the predetermined value X (time T2 in FIG. 8; the time at which the coolant temperature reaches B). That is, the clutch actuator 211 is controlled such that the clutch stroke position changes in the engaging direction, thus reducing the number of engine revolutions. At the time that the number of engine revolutions matches the target NE (time T3 in FIG. 8; the time at which the number of engine revolutions reaches C), control of the automatic clutch 2 is ended, and the routine returns to ordinary clutch control.

As described above, with this embodiment, volume expansion of the working oil is inferred from the amount of change in the temperature of the working oil, and when the working oil temperature is increased, the clutch stroke position is changed in the clutch engaging direction such that when the inside of the clutch master cylinder 210 is no longer in communication with the reservoir tank 214, the number of engine revolutions at that time is set to the target number of revolutions. Thus, there is little slippage of the clutch, so rotational drive power from the engine 1 is adequately transmitted to the transmission 3 side, and the increase in the number of engine revolutions is eliminated, so it is possible to achieve an improvement in starting movement and acceleration performance when the automobile begins to move, and an improvement in creeping travel performance in the case of creeping travel. Also, it is possible to suppress the amount of friction of the clutch disk 22, and possible to avoid conditions in which working oil volume expansion that accompanies an increase in the amount of heat generated by the clutch disk 22 is promoted.

Also note that in this embodiment, when working oil volume expansion has occurred, the number of engine revolutions is adopted as the target number of revolutions, but instead, it is possible to adopt the number of revolutions of the input shaft 31 of the transmission 3, the number of revolutions of the output shaft 32 of the transmission 3, or the number of revolutions of the drive wheel 7 (vehicle wheel speed). That is, these numbers of revolutions when the clutch master cylinder 210 moved to a state of non-communication with the reservoir tank 214 are used as the target number of revolutions. In this case, the number of revolutions of the input shaft 31, the number of revolutions of the output shaft 32, and the number of revolutions of the drive wheel 7 decrease with working oil volume expansion, so the clutch stroke position is moved in the engaging direction such that the number of revolutions increases to the target number of revolutions.

Second Embodiment

Next, a second embodiment will be described. This embodiment is for a case in which the invention is applied to a "pressure-engaged type" of automatic clutch in which a clutch engaged state is established when using oil pressure (when applying pressure) from the hydraulic control apparatus, and a clutch disengaged state is established when oil pressure is released. Otherwise, the configuration of the vehicle powertrain and the like are the same as in the first embodiment described above, so here, only the points that differ from the first embodiment will be described.

Operation of Clutch Control when Working Oil Temperature is Changed

In the case of this sort of "pressure-engaged type" of automatic clutch, conventionally, when volume expansion of the working oil occurs with an increase in temperature, although the piston is not moving within the clutch master cylinder, the release bearing is pressed to the diaphragm spring side to the extent of that volume expansion, and so the clutch stroke is moved in the engaging direction. Therefore, there is a possibility that the load on the engine will become too large and thus when the vehicle begins to move or during creeping travel, a sudden drop in the number of engine revolutions will occur, leading to an engine stall.

In this embodiment as well, when this sort of working oil temperature increase has occurred, it is possible to appropriately adjust the clutch stroke. Specifically, the same operation is performed as in the first embodiment described above, in the case described using the flowchart in FIG. 7. In the case of the present embodiment, as control of the automatic clutch 2 in Step ST8, because the clutch stroke has changed in the engaging direction to the extent of the working oil volume expansion, the clutch actuator 211 is controlled such that the clutch stroke changes in the disengaging direction. That is, the clutch stroke is changed in the disengaging direction such that the load on the engine 1 will not become too large when the vehicle begins to move or during creeping travel.

FIG. 9 is a timing chart that shows an example of a clutch control operation when coolant temperature (the temperature for estimating the working oil temperature) is changed according to this embodiment, and shows the state of coolant temperature change (corresponding to the state of working oil temperature change), changes in clutch stroke position, and changes in the number of engine revolutions.

FIG. 9 shows a case in which, after moving from the clutch disengaged state to the creeping travel state, the temperature increase amount dT of the coolant has reached at least the predetermined value X. Such a case will be specifically described below.

First, from a state in which the clutch is disengaged and the clutch master cylinder 210 is in communication with the reservoir tank 214, creeping travel is started, thus establishing a state in which the clutch master cylinder 210 is not in communication with the reservoir tank 214 (time T4 in FIG. 9; the clutch stroke position at this time is indicated by D). Then, the number of engine revolutions at this time is stored as the target NE.

When volume expansion due to an increase in the temperature of the working oil has occurred, although the position of the piston 210a detected with the stroke sensor 212b has not changed, actually, the clutch stroke position has moved in the engaging direction due to the working oil volume expansion (see the single-dotted chained line in FIG. 9).

Afterward, the automatic clutch 2 is controlled such that a condition in which the clutch master cylinder 210 is in non-communication with the reservoir tank 214 is maintained so that the coolant temperature progressively increases, and the number of engine revolutions approaches the target NE at the time that the temperature increase amount dT reaches at least the predetermined value X (time T5 in FIG. 9; the time at which the coolant temperature reaches E). That is, the clutch actuator 211 is controlled such that the clutch stroke position changes in the disengaging direction, thus increasing the number of engine revolutions. At the time that the number of engine revolutions matches the target NE (time T6 in FIG. 9; the time at which the number of engine revolutions reaches F), control of the automatic clutch 2 is ended, and the routine returns to ordinary clutch control.

As described above, with this embodiment, volume expansion of the working oil is inferred from the amount of change in the temperature of the working oil, and when the working oil temperature is increased, the clutch stroke position is changed in the clutch disengaging direction. This makes it possible to lighten the load on the engine 1 to avoid engine stalls, thereby obtaining good performance during starting movement and good creeping travel performance during creeping travel.

Also note that in this embodiment as well, when working oil volume expansion has occurred, the number of engine revolutions is adopted as the target number of revolutions, but instead, it is possible to adopt the number of revolutions of the input shaft 31 of the transmission 3, the number of revolutions of the output shaft 32 of the transmission 3, or the number of revolutions of the drive wheel 7 (vehicle wheel speed).

Other Embodiments

In each of the embodiments described above, an AMT having five forward gears is described as the transmission 3, but this is not a limitation of the invention; the invention is also applicable to other transmissions having gears as desired. Furthermore, the invention is not limited to an AMT, and is also applicable to an automatic clutch incorporated in a manual transmission (non-AMT).

Also, in each of the embodiments described above, an example is described in which the invention is applied to a vehicle equipped with only the engine 1 (internal combustion engine) as a drive source, but this is not a limitation of the invention; for example, the invention is also applicable to a hybrid vehicle equipped with both an engine (internal combustion engine) and an electric motor (for example, such as a traction motor or a generator motor) as a drive source.

Also, in each of the embodiments described above, as a technique for estimating the amount of increase in the temperature of the working oil, and recognizing whether or not volume expansion of the working oil is occurring, the amount of increase in the temperature of the coolant of the engine 1, detected with the coolant temperature sensor 410, is detected. This is not a limitation of the invention; a configuration may also be adopted in which the change in the temperature of the working oil inside the transmission 3 detected with the transmission oil temperature sensor 411 is used, or the temperature of the working oil of the automatic clutch 2 can be directly detected.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority based on Japanese Patent Application No. 2007-208803 filed in Japan on Aug. 10, 2007, the entire contents of which are hereby incorporated by reference. Furthermore, the entire contents of references cited in the present description are hereby specifically incorporated by reference.

INDUSTRIAL APPLICABILITY

The invention is applicable to an automatic clutch that can obtain an appropriate clutch stroke position even when volume expansion occurs in working oil, and thus can insure high reliability.

The invention claimed is:

1. An automatic clutch control apparatus comprising a clutch mechanism that is disposed between a drive source and a transmission, and due to a clutch stroke position changing, engages and disengages the drive source and the transmission with each other; a fluid pressure generating means that generates an working fluid pressure for changing the clutch stroke position of the clutch mechanism, and causes the working fluid pressure to act on the clutch mechanism via a fluid pressure acting path; and a stroke position detecting means for detecting the clutch stroke position of the clutch mechanism by detecting the operating position of the fluid pressure generating means; wherein based on the clutch stroke position detected with the stroke position detecting means, the operating position of the fluid pressure generating means is adjusted to change the clutch stroke position of the clutch mechanism; the automatic clutch control apparatus comprising:

a temperature change amount recognizing means that detects or estimates an amount of change in the temperature of the working fluid;

a revolutions detecting means that detects the number of revolutions of an input side or an output side of the clutch mechanism; and a fluid pressure control means that, when the amount of change in the temperature of the working fluid that has been detected or estimated with the temperature change amount recognizing means has reached a predetermined control switching temperature change amount, controls operation of the fluid pressure generating means based on the number of revolutions of the input side or the output side of the clutch mechanism detected with the revolutions detecting means.

2. The automatic clutch control apparatus according to claim 1, wherein the clutch mechanism, when an working fluid pressure has been received from the fluid pressure generating means, disengages the drive source and the transmission from each other, and when the working fluid pressure from the fluid pressure generating means is released, engages the drive source and the transmission with each other; and the fluid pressure control means, when the amount of change in the temperature of the working fluid that has been detected or estimated with the temperature change amount recognizing means has reached a predetermined control switching temperature change amount, changes the clutch stroke position in the direction that the drive source and the transmission engage with each other, such that the number of revolutions of the input side or the output side of the clutch mechanism detected with the revolutions detecting means returns to the number of revolutions before volume expansion accompanying the change in the temperature of the working fluid occurred.

3. The automatic clutch control apparatus according to claim 2, wherein the fluid pressure generating means is configured such that a piston is movably stored inside of a clutch master cylinder, and working fluid pressure that is caused to act on the clutch mechanism is changed with movement of this piston, and a reservoir tank is connected to the clutch master cylinder, and in a state in which the piston has moved forward to a position where the fluid pressure acting path and the reservoir tank are not in communication, the working fluid pressure is generated with the fluid pressure acting path as a closed circuit; and the temperature change amount recognizing means detects or estimates the amount of change in the temperature of the working fluid in a period during which the state in which the fluid pressure acting path is a closed circuit continues, and is configured such that the operation to detect or the operation to estimate the amount of change in the temperature of the working fluid is cancelled when the piston has withdrawn to a position where the fluid pressure acting path and the reservoir tank are in communication.

4. The automatic clutch control apparatus according to claim 1, wherein the clutch mechanism, when an working fluid pressure has been received from the fluid pressure generating means, engages the drive source and the transmission with each other, and when the working fluid pressure from the fluid pressure generating means is released, disengages the drive source and the transmission from each other; and the fluid pressure control means, when the amount of change in the temperature of the working fluid that has been detected or estimated with the temperature change amount recognizing means has reached a predetermined control switching temperature change amount, changes the clutch stroke position in the direction that the drive source and the transmission disengage from each other, such that the number of revolutions of the input side or the output side of the clutch mechanism detected with the revolutions detecting means returns to the number of revolutions before volume expansion accompanying the change in the temperature of the working fluid occurred.

5. The automatic clutch control apparatus according to claim 4, wherein the fluid pressure generating means is configured such that a piston is movably stored inside of a clutch master cylinder, and working fluid pressure that is caused to act on the clutch mechanism is changed with movement of this piston, and a reservoir tank is connected to the clutch master cylinder, and in a state in which the piston has moved forward to a position where the fluid pressure acting path and the reservoir tank are not in communication, the working fluid pressure is generated with the fluid pressure acting path as a closed circuit; and the temperature change amount recognizing means detects or estimates the amount of change in the temperature of the working fluid in a period during which the state in which the fluid pressure acting path is a closed circuit continues, and is configured such that the operation to detect or the operation to estimate the amount of change in the temperature of the working fluid is cancelled when the piston has withdrawn to a position where the fluid pressure acting path and the reservoir tank are in communication.

6. The automatic clutch control apparatus according to claim 1, wherein the fluid pressure generating means is configured such that a piston is movably stored inside of a clutch master cylinder, and working fluid pressure that is caused to act on the clutch mechanism is changed with movement of this piston, and a reservoir tank is connected to the clutch master cylinder, and in a state in which the piston has moved forward to a position where the fluid pressure acting path and the reservoir tank are not in communication, the working fluid pressure is generated with the fluid pressure acting path as a closed circuit; and the temperature change amount recognizing means detects or estimates the amount of change in the temperature of the working fluid in a period during which the state in which the fluid pressure acting path is a closed circuit continues, and is configured such that the operation to detect or the operation to estimate the amount of change in the temperature of the working fluid is cancelled when the piston has withdrawn to a position where the fluid pressure acting path and the reservoir tank are in communication.

7. The automatic clutch control apparatus according to claim 6, wherein the revolutions detecting means detects the number of revolutions of the input side or the output side of the clutch mechanism at the time when the fluid pressure acting path becomes a closed circuit; and the fluid pressure control means, when the amount of change in the temperature of the working fluid that has been detected or estimated with the temperature change amount recognizing means has reached a predetermined control switching temperature change amount, sets the number of revolutions detected with the revolutions detecting means as a target number of revolutions, and controls operation of the fluid pressure generating means such that the number of revolutions of the input side or the output side of the clutch mechanism matches the target number of revolutions.

* * * * *